UNITED STATES PATENT OFFICE.

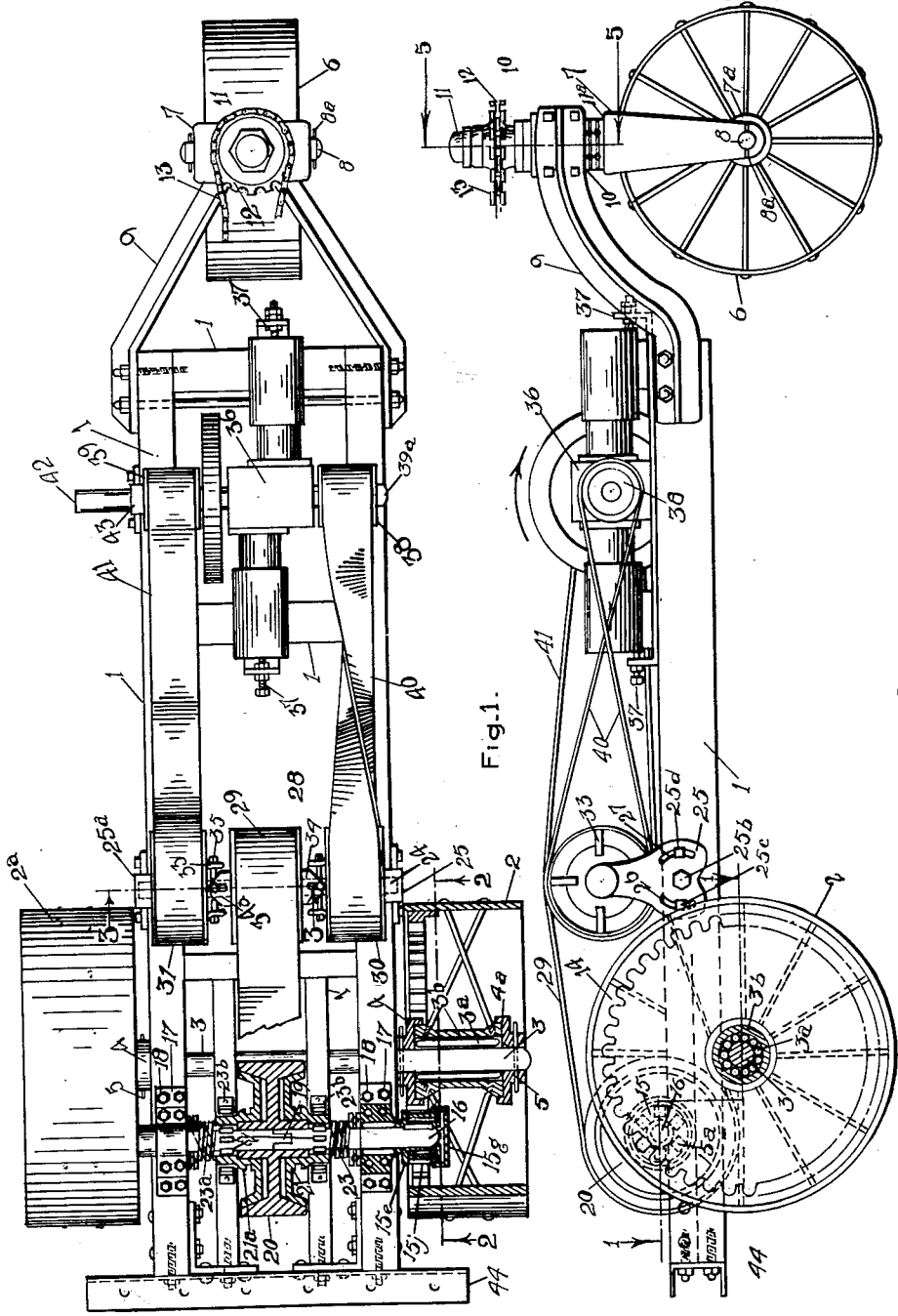

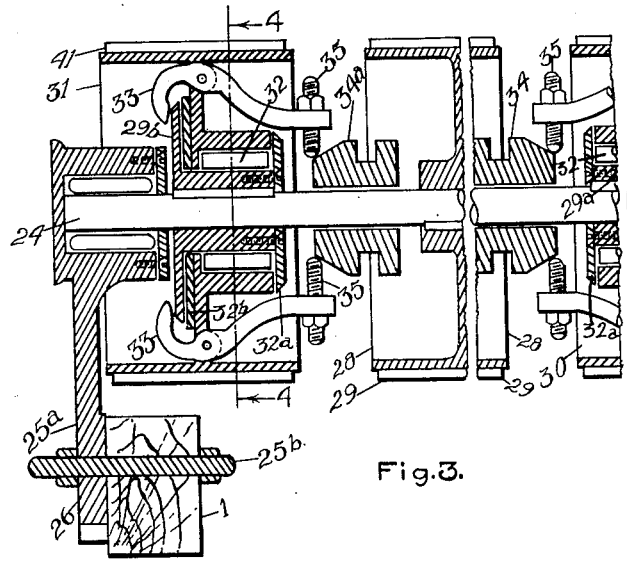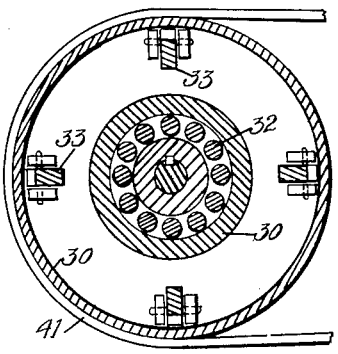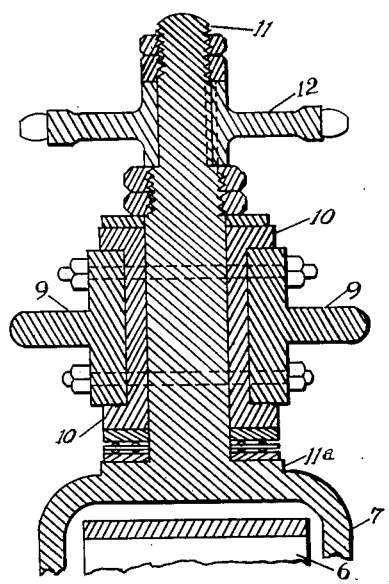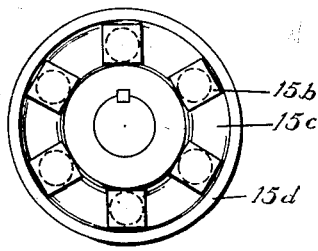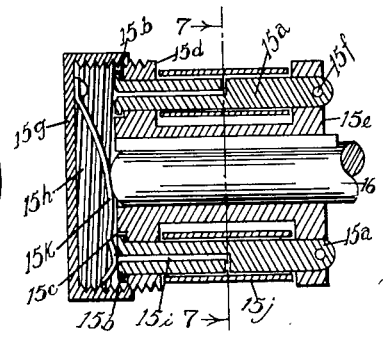

WILLIAM M. BREWEN AND FLETCHER P. FOSTER, OF SAN JOSE, CALIFORNIA.

TRACTOR.

1,331,141.        Specification of Letters Patent.      Patented Feb. 17, 1920.

Application filed August 22, 1918. Serial No. 251,032.

*To all whom it may concern:*

Be it known that we, WILLIAM M. BREWEN and FLETCHER P. FOSTER, citizens of the United States, residing at San Jose, in the county of Santa Clara and State of California, have invented new and useful Improvements in Tractors, of which the following is a specification.

Our invention relates to improvements in tractors of the ground wheel type in which the power is transmitted by a system of belts and pulleys controlled by clutches, and the objects of our invention are:

First, to provide a tractor that is inexpensive to operate and low in cost of manufacture and upkeep.

Second, to provide a tractor that will be low in height, adapted for the cultivation of orchards where it is necessary to operate under the limbs of the trees.

Third, to provide a tractor, the low cost of manufacturing of which will place it within the pecuniary reach of the average small land owner.

Fourth, to provide a tractor in which the power is transmitted by belts and clutch pulleys, thus elminating a great amount of gearing and numerous wearing parts.

A further object is to generally improve this class of tractors so as to increase their usefulness, durability, and efficiency.

With these and other objects in view our invention resides in certain novel features of construction and in the unique combination of parts to be hereinafter more fully described and claimed, it being understood that various changes in form, proportion and minor details of construction may be resorted to within the scope of the appended claims.

Reference is to be had to the accompanying drawings forming a part of this specification in which similar reference characters indicate corresponding parts in all the views.

Figure 1 is a plan view of our tractor part in section as shown on line 1—1 of Fig. 2.

Fig. 2 is a side view of our tractor, part in section as shown on line 2—2 of Fig. 1.

Fig. 3 is an enlarged sectional view on line 3—3 of Fig. 1 parts broken away.

Fig. 4 is sectional view on line 4—4 of Fig. 3.

Fig. 5 is a sectional view on line 5—5 of Fig. 2.

Fig. 6 is a longitudinal sectional view through the roller pinion.

Fig. 7 is a sectional view as indicated on line 7—7 of Fig. 6.

Fig. 8 is an end view of the roller pinion, the cap removed, showing square heads on the roller pins and the groove to receive them.

Our improved tractor, forming the subject matter of the present invention, comprises a frame 1 which may be made of wood, iron or any other suitable material of the required strength to maintain the working parts of my tractor in place. Ground traction wheels are shown at 2—2$^a$ rotatively mounted on a suitable shaft or axle 3 by means of rollers 3$^a$ in the hub 3$^b$ of the ground wheels 2—2$^a$, said wheels being held in place by means of the flanged collars 4—4$^a$ which are secured to the axle by pins 5. The axle 3 is secured to the frame 1 in any suitable manner.

The ground traction wheels 2—2$^a$ may have smooth treads or may be fitted with removable grousers or ground gripping treads as desired. A front rudder wheel is shown at 6 rotatively mounted in the forks 7 by roller bearings 7$^a$ and axle 8, said axle being held in place by means of pins 8$^a$. The forks 7 are turnably secured to the frame 1 of the tractor by means of the goose neck 9, said goose neck being bolted to the frame 1 in any suitable manner. A bearing is shown bolted to the goose neck at 10, adapted to receive the shaft 11 of the forks 7 thereby mounting the forks in such a manner that the same may be turned about a vertical axis.

Thrust bearings of the usual type are positioned between the bearing 10 and the shoulders 11$^a$ of the fork crown thereby lessening the friction at that point.

A sprocket wheel is shown at 12 which is securely keyed to the shaft 11 and is adapted to engage a short length of sprocket chain 13, which may be connected to a suitable hand steering wheel by cables or rods whereby the sprocket may be turned for the purpose of directing the rudder wheel 6 for guiding or steering the tractor. The steering wheel and connections are not shown. Each of the ground traction wheels 2—2ª is provided with an internal ring gear 14 securely fastened to the wheel in any suitable manner. Engaging the internal ring gear 14 of each wheel is the roller pinion gear 15 shown in detail in Figs. 6—7—8. The pins 15ª of the roller pinions have a square head 15ᵇ at one end which rests in a groove 15ᶜ in the flange 15ᵈ of the spool shaped body portion 15ᵉ, preventing the pins 15ª from turning. The pins are provided at the other end with openings through which suitable cotter pins or wire may be inserted to hold the pins in place as shown at 15ᶠ. The outer periphery of the flange 15ᵈ is machine threaded and adapted to receive the threaded cap 15ᵍ thereby forming a space 15ʰ for receiving grease or other lubricant. The pins 15ª are provided with longitudinal bores 15ⁱ communicating with the friction surface between the steel rollers 15ʲ and pins 15ª whereby grease may be forced in by screwing on the cap 15ᵍ.

A friction spring is shown at 15ᵏ adapted to hold the cap in adjusted position. The pinion gears 15 are keyed to a divided transverse jack shaft 16 as shown in Fig. 1, one on each end thereof, the shaft being journaled in the roller bearings 17 which are secured to the frame 1 by bolts 18. The abutting ends of this divided jack shaft are held in alinement by means of a pintle and socket 19.

A double clutch pulley is shown at 20 rotatively mounted on the shaft 16 and positioned directly over the pintle and socket 19. Manually operated clutch members are shown at 21—21ª one on each side of the clutch pulley 20 and slidably mounted on shaft 16 and held against turning on said shaft by a plurality of keys or splines 22. The clutch members 21—21ª are normally held in engagement with the clutch pulley 20 by means of coiled springs 23—23ª. Each clutch member may be disengaged from the clutch pulley by any suitable system of pedals and bell cranks operated from a suitable driver's seat, seat and clutch operative mechanism not shown. The clutch members 21—21ª are provided, each, with roller bearings supported on stanchions 23ᵇ attached to the frame 1 adapted to maintain the divided shaft and its mechanism in alinement when under a working stress or load.

A distance forward of the transverse divided shaft 16 is a second undivided transverse counter shaft 24 shown in detail in Figs. 3-4, mounted on adjustable tilting stanchion roller bearings 25—25ª positioned at each end of the shaft 24. These stanchion bearings are pivotally attached to the frame 1 by bolts 25ᵇ and are held rigid in place by means of lock nuts 25ᶜ—25ᵈ on suitable bolts working in slots 26—27 whereby the stanchion bearings may be tilted forward or backward and held rigid in the desired position.

Midway between the bearings 25—25ª and keyed to shaft 24 is the pulley wheel 28 in alinement with the double clutch pulley wheel 20, and operatively connected thereto by means of a suitable flexible belt 29. At each side of the pulley wheel 28 and rigidly keyed on shaft 24 are the clutch members 29ª—29ᵇ having coacting clutch pulleys 30—31 rotatively and slidably mounted thereon by means of rollers 32 and metal disk 32ª. A friction disk is shown at 32ᵇ positioned between the clutch member 29ᵇ and clutch pulley 31 as shown in Fig. 3.

A plurality of levers are shown at 33, actuated by means of the sliding cones 34—34ª whereby the levers 33 are caused to bind the clutch members together when the sliding cones are forced under the adjusting screws 35. The cones 34 and 34ª may be operated by a suitable system of levers and connecting rods from a driver's seat, these not being shown in the drawing; they may be of any ordinary construction.

Near the forward end of the frame 1 is shown an internal combustion engine 36 slidably mounted on the frame 1 and adjustable by means of adjusting screws 37 whereby the engine may be moved toward or away from the clutch pulleys 30—31 and held in the adjusted position. The engine is provided with suitable pulleys 38—39 keyed to the crank shaft 39ª and mounted in alinement with the clutch pulleys 30—31 respectively and operatively connected thereto by flexible belts 40—41.

The belt 40 connecting pulley 38 with pulley 30 is a crossed belt for the purpose of reversing while the belt 41 connecting pulley 39 with pulley 31 is a straight belt, for the forward drive.

The crank shaft 39ª is shown projecting a distance through pulley 39 at 42 and is journaled in a suitable adjustable bearing 43. To the end 42 may be attached a pulley wheel or other suitable means for transmitting power from the engine to other machinery when desired. A suitable draw bar is shown at 44 attached securely to the frame 1 by suitable bolts and angle irons.

The operation of our tractor is as follows:
Power derived from the engine 36, running in the direction indicated by the arrow, is transmitted by the belts 40—41 to the pulleys 30—31 respectively, rotating the pulleys in opposite directions.

When sliding cone 34ª is forced in between the adjusting screws 35, the levers 33 bind the pulley 31 into engagement frictionally, with the clutch member 29ᵇ transmitting the power to the pulley wheel 28 which, in turn, transmits the power by means of belt 29 to the double clutch pulley 20. The slidable clutch members 21—21ª being held in engagement with the double clutch pulley wheel 20 cause the divided jack shaft 16 to rotate; the roller pinion gears 15 keyed to jack shaft 16 engaging the internal ring gear 14 cause the ground wheels 2—2ª to revolve thus driving the tractor forward.

To reverse or drive backward the sliding cone 34ª is disengaged and the sliding cone 34 is operated, thus binding the reversing pulley 30 to the counter shaft, transmitting the power to the pulley wheel 28 but revolving it in the opposite direction thereby reversing the rotation of the ground wheels.

To assist in turning and to give better control and manipulation of the tractor, the double clutch pulley wheel 20 has slidable clutch members 21—21ª coacting therewith whereby either ground wheel may be disconnected from the power independently or both may be disconnected at once. The rudder wheel 6 guides or pilots the tractor when manually held in the desired position by a suitable steering wheel not shown.

Having thus described our invention, what we claim as new and desire to secure by Letters Patent is:—

1. In a tractor of the class described, a frame for supporting the working parts thereon; ground traction wheels rotatively mounted on and supporting said frame; a divided jack shaft rotatively mounted transverse to said frame and journaled in roller bearings; roller pinion gears keyed to the jack shaft, one on each end thereof; a double clutch pulley rotatively mounted on the jack shaft and positioned over the division in said shaft; clutch members, adapted to engage the double clutch pulley, one on each side thereof, said clutch members being slidably keyed to the divided jack shaft; roller bearings in which said clutch members are journaled and supported in place; means for engaging and disengaging said clutch members with the double clutch pulley whereby the rotation of the roller pinion gears may be controlled when the double clutch pulley is revolved; a counter shaft having a pulley wheel keyed thereon in alinement with the double clutch pulley on said jack shaft and belted thereto, said counter shaft being positioned a distance forward of the jack shaft and parallel therewith; adjustable roller bearings in which said shaft is mounted to the frame; a plurality of clutch members rigidly keyed to the counter shaft; clutch pulleys rotatively and slidably mounted on each clutch member adapted to engage said clutch members; roller bearings on which the clutch pulleys are mounted: means for engaging and disengaging said clutch pulleys with the clutch members and power operative means for revolving said clutch pulleys in opposite directions substantially as described.

2. The combination in a tractor of a plurality of manually operated clutch pulleys adapted to receive flexible belts thereon; a transverse counter shaft to which said clutch pulleys are attached; roller bearings in which said counter shaft is journaled; means for tilting said bearings forward or backward and means for securing said bearings in adjusted position; a pulley wheel keyed rigidly to said counter shaft adapted to be rotated by said shaft and power operative means for revolving said clutch pulleys in opposite directions.

3. The combination in a tractor of a plurality of manually operated clutch pulleys adapted to receive flexible belts thereon; means for operating said clutch pulleys; a transverse counter shaft to which said clutch pulleys are attached; adjustable bearings in which said shaft is journaled; said shaft having a pulley wheel keyed rigidly to the shaft and adapted to receive a flexible belt thereon; a divided transverse jack shaft rotatively mounted to the frame parallel with the counter shaft; a double clutch pulley rotatively mounted on the jack shaft in alinement with the pulley wheel on the counter shaft and positioned over the division in said jack shaft, said double clutch pulley being adapted to receive a flexible belt thereon; clutch members slidably keyed to the jack shaft, adapted to frictionally engage the sides of the double clutch pulley; means for operating the clutch members whereby either end of the divided jack shaft may be released from revolving when said double clutch pulley is revolving, and flexible belt operative means for revolving said pulleys and clutch pulleys when belted to a suitable power substantially as shown and described.

In testimony whereof we hereby affix our signatures at San Jose, California, this 14 day of August, 1918.

WILLIAM M. BREWEN.
FLETCHER P. FOSTER,